July 28, 1959 W. J. SCHOUTEN 2,896,679
SCREENING DEVICE FOR A REVOLVING TOOL
Filed Dec. 23, 1957

WILHELMUS JOHANNES SCHOUTEN
INVENTOR

BY
ATTORNEY

United States Patent Office 2,896,679
Patented July 28, 1959

2,896,679

SCREENING DEVICE FOR A REVOLVING TOOL

Wilhelmus Johannes Schouten, Maarssen, Netherlands, assignor to N. V. Het Spoorwegbouwbedrijf, Utrecht, Netherlands, a Dutch limited-liability company of the Netherlands Application December 23, 1957, Serial No. 704,465

Claims priority, application Netherlands December 21, 1956

6 Claims. (Cl. 144—251)

The invention relates to a device for screening a milling cutter or a similar revolving tool and for guiding the workpiece treated with it, in which two aligned guiding members approach the surface of revolution described by the tool almost tangentially and leave a groove in between, through which groove the tool is allowed to operate on the workpiece sliding past the guiding members, the groove being bridged by parallel rods at right angles to the axis of the tool, between which rods the operative parts of the tool extend. A device of this kind is known in practice and forms a good protection for the operator of a tool of the kind referred to, more particularly of a rapidly revolving wood-milling cutter. This device is employed in particular when straight workpieces of wood have to be given a special shape by milling. In such a case the workpiece is fed past the said guiding members and, where it passes by the groove, past the said rods, so that an uninterrupted guidance is obtained. The rods may approach axially close to the milling cutter, as a result of which non-vibrational guidance can also be obtained for the workpiece.

The only drawback of the existing device is that when the tool is replaced and the bridging rods have to be readjusted accordingly (in a direction at right angles to their longitudinal direction), this readjustment is rather a time-consuming job. Several screw bolts have to be unscrewed for it and fastened again after the readjustment of the rods, while the alignment of the rods has to be performed with great accuracy.

The invention has for its object to furnish a construction which causes a considerable simplification and speeding-up of the said readjustment.

To achieve this object, according to the invention the guiding members end in bevelled blocks, the front surfaces of which are provided with parallel, closely spaced grooves, into which fit the ends of the said rods, while said grooves are partly covered with a view to locking the ends of the rods.

The drawing illustrates a preferred embodiment of the invention by way of example only.

Extending above the table top 1 is the spindle 2 of the cutter, which carries the cutter head 3, on which the cutter 4 has been secured.

Figure 1:
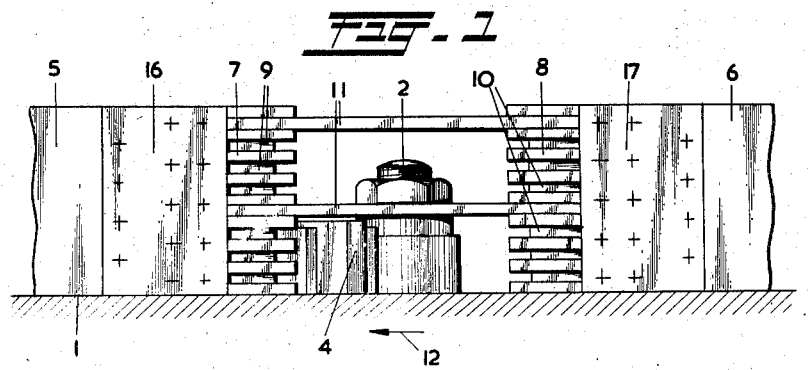
Figure 1 is a front elevation of the table of a milling machine with a cutter on a vertical spindle.
Figure 2:
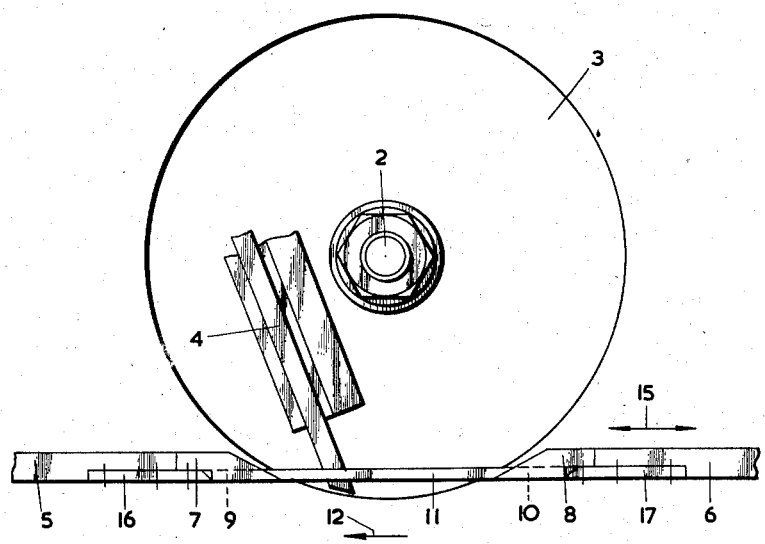
Figure 2 is a plan view of Figure 1.
Figure 3:
Figure 3 shows a separate rod.

The guiding members consist of the guide plates 5 and 6, which are aligned and approach the path of the cutter 4 almost tangentially. On the facing heads of the guide plates 5 and 6 have been fitted bevelled metal blocks 7 and 8. The front surfaces of the latter are provided with a number of parallel and equally spaced grooves 9, 10. Into these grooves fit rods 11, one of which is shown in detail in Figure 3.

In accordance with the width of the workpiece to be milled, which is fed in the direction of the arrow 12 past the guide plates 6 and 5 past the cutter, a number of rods 11 are placed in the grooves 9 and 10. In the case illustrated in the figures two rods 11 have been so placed, the lowermost of which lies just above the operative area of the cutter 4.

The rods 11 have been provided with bevelled ends 13, 14. When they have to be placed or exchanged, one of the guide plates 5 or 6 is displaced in the direction of the arrow 15. The rods 11 can then readily be placed in the grooves 9 and 10. When the guide plate 5 or 6 is subsequently displaced again in the direction of the groove, the bevelled ends 13, 14 of the rods are locked behind the metal cover plates 16, 17, which partly cover the grooves 9, 10. The rods 11 are thus quite securely fixed and provide for the necessary bridging of the groove in the tool.

What I claim is:

1. A combined guide and screening means for a rotary milling cutter or a similar rotary tool, said means comprising two opposed separate similar guiding members having coplanar working surfaces, said guiding members being longitudinally spaced from each other to provide a recess between the opposed ends thereof through which the tool projects into engagement with a work piece being moved past said guiding members during operation; each of said guiding members being provided with a transversely extending groove in the working surface thereof, a complementary cover plate secured in each of said transversely extending grooves, the working surface of each of said guiding members being also provided with a plurality of longitudinally extending closely spaced parallel grooves which extend outwardly from said transversely extending grooves to the opposing ends of said guiding members, said recess being bridged by longitudinally extending spaced parallel rods the ends of which are removably mounted in selected ones of said longitudinally extending grooves, and locking means by which said rods are locked in said longitudinally extending grooves.

2. A combined guide and screening means as defined by claim 1 in which said locking means comprises bevelled complementary opposed inter-engaging surfaces carried by said rods and said cover plates.

3. A combining guide and screening means as defined by claim 2 in which at least one of said guiding members is adapted to be longitudinally moved a sufficient distance to move the bevelled surface of the cover plate carried thereby out of engagement with opposed bevelled ends of said rods.

4. A combined guide and screening means for a rotary milling cutter or a similar rotary tool disposed above a table for rotation about a vertical axis, said means comprising two separate similar vertically disposed guiding members which are adapted to be secured to said table top in longitudinally spaced opposed relations to each other with the front faces thereof coplanar thereby providing a recess through which the cutter projects into engagement with a work piece being moved past said guiding members during operation; each of said guiding members being provided with a vertically disposed groove in the front face thereof, a complementary cover plate disposed in each of said vertically disposed grooves, the front face of each of said guiding members being also provided with a plurality of horizontally disposed closely spaced parallel grooves which extend outwardly from said vertically disposed grooves to the opposing ends of said guiding members, said recess being bridged by horizontally disposed vertically spaced parallel rods the ends of which are removably mounted in selected ones of said horizontally disposed grooves, and locking means by which said rods are locked in said horizontally disposed grooves.

5. A combined guide and screening means as defined by claim 4 in which said locking means comprises bevelled complementary opposed inter-engaging surfaces carried by said rods and said cover plates.

6. A combining guide and screening means as defined by claim 5 in which at least one of said guiding members is adapted to be longitudinally moved a sufficient distance to move the bevelled surface of the cover plate carried thereby out of engagement with opposed bevelled ends of said rods.

References Cited in the file of this patent

UNITED STATES PATENTS

| | | |
|---|---|---|
| 211,699 | Cardiff | Jan. 28, 1879 |
| 775,477 | Novlin | Nov. 22, 1904 |
| 915,496 | Sodergren | Mar. 16, 1909 |
| 984,237 | Osburn | Feb. 14, 1911 |
| 1,989,285 | Merrigan | Jan. 29, 1935 |